(No Model.)

C. W. HUNT.
MEASURING APPARATUS FOR COAL.

No. 537,116.   Patented Apr. 9, 1895.

WITNESSES:
Joseph Strachan.
Wm. Livingston

INVENTOR
Charles W. Hunt.
BY
Livingston Emmy
ATTORNEY

UNITED STATES PATENT OFFICE.

CHARLES W. HUNT, OF WEST NEW BRIGHTON, NEW YORK.

MEASURING APPARATUS FOR COAL.

SPECIFICATION forming part of Letters Patent No. 537,116, dated April 9, 1895.

Application filed December 14, 1893. Serial No. 493,629. (No model.)

*To all whom it may concern:*

Be it known that I, CHARLES W. HUNT, of West New Brighton, county of Richmond, and State of New York, have invented certain new and useful Improvements Relating to Measuring Apparatus for Coal or other Products, of which the following is a specification, reference being had to the accompanying drawings, forming a part of the same, wherein—

Figure 1:
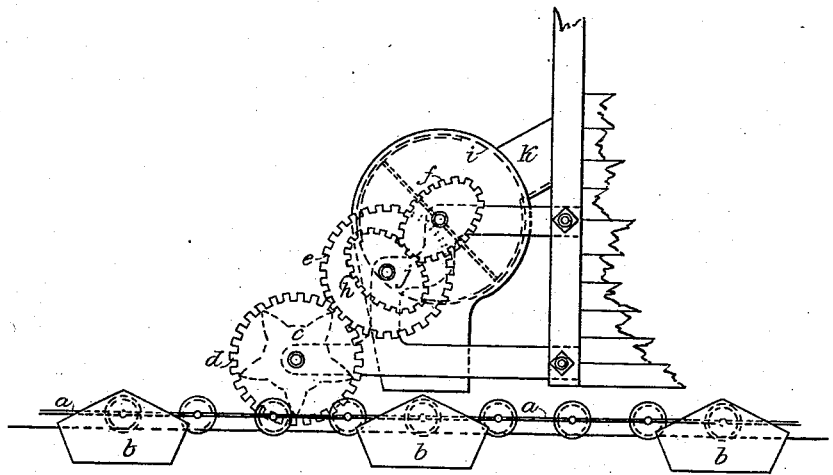
Figure 2:
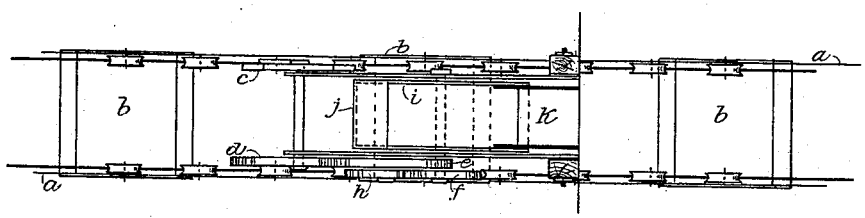

Figure 1 represents a side elevation of my apparatus showing the working parts; Fig. 2, a plan view.

My invention relates to certain improvements whereby a variable motion can be imparted to the measuring mechanism so that the measure shall have a comparatively long time to fill and to dump, but move rapidly when between the two points.

To more specifically describe my invention with reference to the accompanying drawings, a conveyer chain, $a$, carrying buckets $b$ and operated by any suitable means is the source from which the power to operate my measuring apparatus is obtained. To utilize this power I employ a wheel, $c$, which is adapted to engage with some part of the moving chain and revolve the measure $i$ by means of tooth gearing or other suitable device. In the connecting train I have shown a pair of uneven motion non-annular gears, $h$ and $f$. The elliptical shape of these wheels is not material, however, as I may employ any form of gear capable of producing a variable motion. The measure is preferably cylindrical in form and preferably has two compartments, each having receiving openings, $i, j$.

$k$ represents a chute or source of supply. This chute is preferably open on its upper side to enable the edges of the opening of the measuring cylinder to cut up through the material and to permit obstructions to be taken out. The hood of the measure is also open to facilitate the removal of obstructions shown in Fig. 2.

The advantage of the variable motion transmitted to the measure lies in the fact that the motion is so arranged that the measure has its slowest motion when filling and dumping, thereby insuring a more accurate measure each time.

The measure as it revolves forces the edge of its opening up through the coal, thereby raising any article or obstacle before it and forcing the same out through the openings in the hood and chute.

Having now described the working parts of my apparatus I will describe its operation.

When the conveyer is moving in the direction of the arrow, a wheel, $c$, acts to revolve the train and consequently the measure.

I do not wish to limit myself to the train shown in the drawings, as it may be convenient to use a different connecting train, or I may wish to place my measure in a position where the direction of motion of the conveyer chain is different, or I may wish to obtain an intermittent motion of the apparatus. All these changes can be accomplished without departing from the spirit of my invention.

Having now described my invention, what I claim, and desire to secure by Letters Patent, is—

1. A measuring apparatus in combination with a conveyer chain and a suitable variable motion device, substantially as set forth.

2. A measuring apparatus in combination with a common chain and a train of gears, said train having non-annular gears therein for revolving the measure at a variable speed, substantially as set forth.

3. In a measuring apparatus the combination of a conveyer chain with a wheel $c$, gears $d$ and $e$, gears $f$ and $h$ for revolving the measure at a variable speed, substantially as set forth.

CHAS. W. HUNT.

Witnesses:
E. McD. HAWKES,
LIVINGSTON EMERY.